United States Patent [19]

Cull et al.

[11] 4,053,574

[45] Oct. 11, 1977

[54] GAS DESULFURIZATION PROCESS

[75] Inventors: Neville L. Cull, Baker; Paul E. Eberly, Jr., Baton Rouge, both of La.

[73] Assignee: Exxon Research & Engineering Co., Linden, N.J.

[21] Appl. No.: 703,056

[22] Filed: July 6, 1976

[51] Int. Cl.² .............................................. C01B 17/04
[52] U.S. Cl. ................................ 423/573 G; 423/224; 423/230; 423/509
[58] Field of Search ............... 423/224, 508, 509, 573, 423/230

[56] References Cited

U.S. PATENT DOCUMENTS 3,179,497   4/1965   Yawagase ........................... 423/509

OTHER PUBLICATIONS

Mellor, *A Comprehensive Treatise On Inorganic and Theoretical Chem.* vol. XI, Longmans Green & Co., N.Y. 1931, pp. 110–111.
Nickless, G., *Inorganic Sulphur Chemistry*, Elsevger Pub. Co., N.Y. 1968, p. 339.
Hageman, A. M., "Journal of the American Chemical Society" vol. 341, 1919, pp. 329–341.

*Primary Examiner*—G. O. Peters
*Attorney, Agent, or Firm*—Marthe L. Gibbons

[57] ABSTRACT

Hydrogen sulfide is removed from a gaseous mixture by reaction with tellurium dioxide. After the reaction, the resulting tellurium can be reoxidized.

13 Claims, 1 Drawing Figure

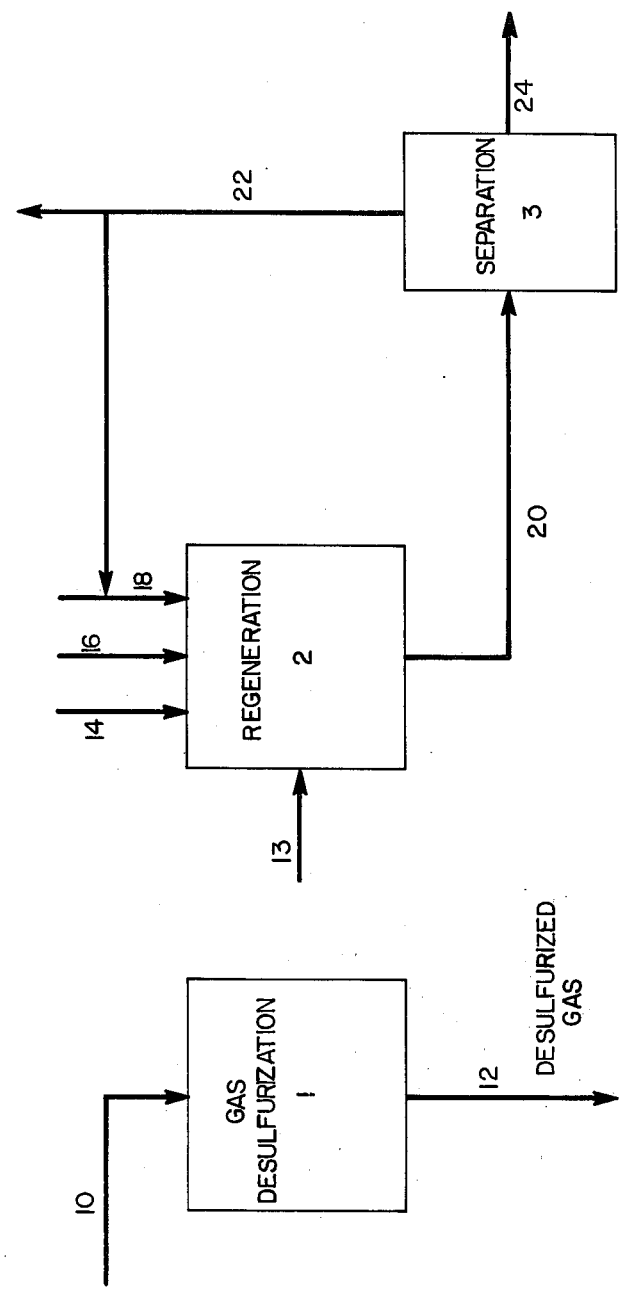

GAS DESULFURIZATION PROCESS

BACKGROUND OF THE INVENTION

1. Field of the Invention

This invention relates to a gas desulfurization process. More particularly, this invention relates to the removal of hydrogen sulfide from a gaseous mixture by reaction of hydrogen sulfide with tellurium dioxide.

2. Description of the Prior Art

It is known to remove hydrogen sulfide from gaseous mixture by low temperature processes, e.g. 200°-300°F., in which the gaseous mixture is scrubbed with liquid solutions, such as mixtures of ethanolamine or mixtures comprising anthraquinone disulfonic acids. It is also known to remove hydrogen sulfide from gaseous mixtures by utilizing various sorbents which selectively remove by sorption the hydrogen sulfide from the gaseous mixture.

It has now been found that hydrogen sulfide can be removed from a gaseous mixture by reaction with tellurium dioxide.

SUMMARY OF THE INVENTION

In accordance with the invention, there is provided a process for removing at least a portion of hydrogen sulfide from a gaseous mixture containing the same, which comprises contacting said gaseous mixture with tellurium dioxide at reaction conditions.

BRIEF DESCRIPTION OF THE DRAWING

The FIGURE is a schematic process flow diagram of an embodiment of the invention.

DESCRIPTION OF THE PREFERRED EMBODIMENTS

The preferred embodiments will be described with reference to the FIGURE Referring to the FIGURE, a gaseous mixture containing hydrogen sulfide is introduced via line 10 into reaction zone 1. Suitable hydrogen sulfide-containing gas mixtures for use in the process of the present invention include gas streams comprising hydrogen and carbon monoxide, e.g., reducing gas, tail gases from petroleum refining processes; gases from Claus plants, etc. The process is particularly well suited to treat gaseous mixtures produced by the gasification of fluid coke, such as shown in U.S. Pat. No. 3,661,543, the teachings of which are hereby incorporated by reference. The gas produced in the gasification fluid coke when the gasification is effected by either air or oxygen have typical compositions shown below.

|  | Air Gasification Mole % | Oxygen Gasification Mole % |
|---|---|---|
| $H_2$ | 6.5 | 24.2 |
| $H_2O$ | 2.9 | 20.0 |
| CO | 19.9 | 34.0 |
| $CO_2$ | 7.9 | 19.8 |
| $N_2$ | 61.9 | 0.1 |
| $H_2S$ | 0.9 | 1.7 |

The actual gas composition to be treated can vary widely and may also include minor amounts of carbonyl sulfide (COS), e.g., 0.01 to 2.00 mole percent COS as well as some light hydrocarbons, e.g., methane.

The process is also suitable to treat gases produced by a gasification of carbonaceous material containing sulfur compounds, such as coal, coke, whole or topped crudes, residua, distillates such as naphtha, gas oil, etc. Natural gas containing hydrogen sulfide may also be treated in accordance with this invention.

Reaction zone 1 contains a bed of tellurium dioxide particles. The bed may be a moving bed, a fixed bed, a fluidized bed, or an ebullating bed. In the embodiment shown in the FIGURE, the particles of tellurium dioxide are maintained in a fixed bed. The tellurium dioxide may be used as such, that is, unsupported, or the tellurium dioxide may be composited with a carrier. Suitable carriers include inorganic oxides such as alumina, amorphous silica-alumina, crystalline silica-alumina zeolites, titania, zirconia, magnesia, thoria, boria and mixtures thereof. Preferably, the support is alumina. Tellurium dioxide may be composited with the carrier in any suitable manner known in the art. Methods for preparing tellurium dioxide and tellurium dioxide composited with a carrier are disclosed for example, in U.S. Pat. Nos. 2,648,638 and 2,653,138, the teachings of which are hereby incorporated by reference.

In reaction zone 1, the hydrogen sulfide-containing gaseous mixture contracts tellurium dioxide which is believed to react with the hydrogen sulfide according to the equation:

$TeO_2 + 2H_2S \rightarrow Te + 2H_2O + 2S \downarrow$

Depending upon the desired level of hydrogen sulfide removal, enough tellurium dioxide should be present in reaction zone 1 to yield the desired desulfurization level. Thus, if substantially complete removal of the hydrogen sulfide is desired, one mole of tellurium dioxide would theoretically be required for each 2 moles of hydrogen sulfide present in the gas, assuming 100% utilization. When the tellurium dioxide is supported on a carrier, it is generally composited with the carrier in amounts ranging from about 1 to about 50 weight percent, of the carrier, preferably from about 10 to about 35 weight percent of the carrier.

Reaction zone 1 is maintained at a temperature ranging from about 25° C. to about 250° C., preferably a temperature ranging from about 75° to about 125° C. The pressure in reaction zone 1 is not critical and may vary widely. A suitable pressure would be atmospheric pressure, although higher pressures may be used.

Suitable gas space velocities of the gas to be desulfurized range from about 400 to 4000 volumes of gas per hour per volume of tellurium-containing solids (V/Hr./V) in the reaction zone, preferably from about 800 to 1200 V/Hr./V. Optionally, an oxygen-containing gas, such as air, may be injected into the gaseous mixture carried in line 10. A suitable amount of oxygen-containing gas would be such as to provide from about 0.5 volume percent to about 5 volume percent molecular oxygen based on the gaseous mixture.

The injection of air into the gaseous mixture permits longer operation before breakthrough occurs.

A gaseous mixture having a reduced content of hydrogen sulfide is removed from reaction zone 1 by line 12. Depending on the desired degree of desulfurization, the gaseous mixture may be either partially desulfurized ($H_2S$) or substantially completely hydrogen sulfide free.

After the reaction of the hydrogen sulfide with tellurium dioxide, the solids in reaction zone 1 (spent or deactivated reactant particles) comprise elemental tellurium and a sulfur deposit. The spent reactant particles are then subjected to a regeneration stage in which the sulfur is removed and the elemental tellurium is reoxidized to tellurium dioxide, according to the equation:

$Te + O_2 \rightarrow TeO_2$.

In the FIGURE, the regeneration stage is shown as occuring in reaction zone 2. It should be understood, however, that when the process is carried out in a fixed bed system, reactors 1 and 2 would be swing type reactors, that is, while gas desulfurization is taking place in one reactor, regeneration of the reactant particles would take place in the other reactor and, subsequently, the operation in the reactors would be switched such that either reactor could be used for gas desulfurization or for reactant regeneration by diverting the flow of gases fed into the reactor, in a conventional way known to be used in swing reactor systems.

Furthermore, if fluid bed reactors are used, then a stream of solids would be continuously circulated to and from the reactors. Returning to reaction zone 2, the deactivated reactant, that is, the solid residue of the gas desulfurization reaction comprising elemental tellurium and sulfur is introduced into reaction zone 2 via line 13. To remove the sulfur deposit from the solids in reaction zone 2, a stripping gas such as nitrogen may be introduced by line 16. Alternatively, the sulfur can be removed from the deactivated reactant solids by washing the solids with a solvent or by a combination of both methods. Suitable solvent would be any known solvent capable of dissolving sulfur, such as, for example, carbon disulfide. When a solvent is used, the solvent can be introduced into the reaction zone 2 by line 18. A stream of solvent containing dissolved sulfur is removed from reaction zone 2 by line 20 and passed to zone 3 which is a solvent and sulfur separation and recovery zone conducted in a conventional manner. If desired, the separated solvent recovered by line 22 can be recycled to reaction zone 2. Sulfur is removed from zone 3 by line 24.

The solid residue from which the sulfur deposit has been removed is subsequently contacted in reaction zone 2 with an oxidizing gas, such as an oxygen-containing gas, for example, oxygen, air, or mixtures thereof, to oxidize tellurium to tellurium dioxide at a temperature ranging from about 300° to about 400° C. The oxygen-containing gas is introduced into reaction zone 2 by line 14. Suitable space velocities for the oxidizing gas range from about 500 V/Hr./V to about 5000 V/Hr./V. The solids in reaction zone 2 may be maintained in a fixed bed, fluidized bed, moving bed, ebullating bed or magnetically stabilized bed. In the embodiment shown in the FIGURE, the solids are maintained in a fixed bed. The pressure in reaction zone 2 is not critical and the regeneration step can be operated at a wide range of pressures such as, far example, from 0 to 600 psig. Preferably, reaction zone 2 is operated at atmospheric pressure. The oxidizing gas contacts the deactivated solids in reaction zone 2 for a time sufficient to convert the desired amount of tellurium to tellurium dioxide. The regenerated tellurium dioxide reactant resulting from the regeneration process can now be utilized for the gas desulfurization reaction stage.

The following examples are presented to illustrate the invention.

EXAMPLE 1

Ten cc (21.8 grams or 0.1365 mols) of tellurium dioxide which had been pelleted, cracked and screened to a 12/20 mesh fraction were charged to a small glass reactor. The space preceding and following the tellurium dioxide was packed with ceramic beads. A gas mixture consisting of 91% nitrogen and 9% hydrogen sulfide was passed downflow through the reactor after it had been lined out at 210° C. The exit gases were passed through a gas bubbler containing 100 cc of 10% cadmium acetate solution and breadthrough was taken at the time when a faint yellow color appeared in the bubbler solution. Exit gas after passing through the bubbler was measured by a wet test meter. Over 2000 volumes of total gas were passed over the tellurium oxide before breakthrough occurred. The gas rate was varied during the run from an initial 180 V/V/Hr. to approximately 600 V/V/Hr. Sulfur was noted on the catalyst and also a white precipitate showed up in the cadmium acetate solution which was shown to be a mixture of cadmium sulfite and cadmium sulfate. This would indicate that some of the sulfur produced is being oxidized. The discharged catalyst after stripping off the sulfur weighed 17.84 grams. The theoretical weight loss for $TeO_2 \rightarrow Te$ is 4.4 grams against an observed weight loss of 4.0 grams. X-ray examination of the discharged catalyst showed metallic tellurium with a small amount of tellurium dioxide.

The above example shows that under the above conditions (210° C.) the following results occur:

1. Quantitative removal of hydrogen sulfide until approximately 2000 volumes of the gas mixture had been passed over the tellurium dioxide.
2. Oxidation of some of the sulfur to sulfur dioxide and sulfur trioxide.
3. If all of the tellurium dioxide had been utilized, the theoretical amount of $H_2S$ adsorbed would be 9.28 grams. At breakthrough, approximately 2.6 grams of $H_2S$ had been absorbed (28%).
4. Loss of capacity due to deposition of sulfur on the oxide.

EXAMPLE 2

Same as Example 1 except 5 cc (11.13 g. 0.0697 mols) of 12/20 mesh tellurium dioxide were used, also the temperature was reduced from 210° to 150° C. and total gas rate (91% $N_2$; 9% $H_2S$) was increased to 700–1000 V/V/Hr. Again approximately 2000 volumes of total gas/vol. of tellurium oxide were passed before any breakthrough occured. Also, no evidence of any white precipitate in the bubbler solution was noted. After breakthrough, the $N_2/H_2S$ mixture was cut out and the catalyst washed with carbon bisulfide to remove the sulfur. The catalyst, after nitrogen stripping, was again exposed to the nitrogen-hydrogen sulfide gas mixture. The weight of sulfur recovered from the carbon bisulfide solution was 1.1 grams. The above procedure was repeated a third time and the data are summarized in Table I.

TABLE I $H_2S$ Removal over $TeO_2$
$H_2S/N_2$ (9/91) approx. V/V/Hr. 850
Temp. 150° C. 5 cc $TeO_2$ Charge

| Run No. | Time to Breakthrough* | Total Vol. of Gas at B.T. | Wt. % Sulfur Recovered, g |
|---|---|---|---|
| 1-A | 130 min. | 9.5 li | 1.1 |
| 1-B | 135 min. | 9.9 li | 1.1 |
| 1-C | 114 min. | 8.7 li | 1.0 |

*Breakthrough (B.T.) as determined by development of faint yellow color in cadmium acetate bubbler solution.

On discharge the $TeO_2$ had lost 1.4 grams (64%) compared to a theoretical loss of 2.2 grams for $TeO_2 \rightarrow Te$. Total sulfur recovered was 3.2 grams (72%) versus a theoretical amount of 4.46 grams.

The above data indicate:
1. Lowering of temperature reduced oxidation of sulfur.
2. Removal of sulfur resulted in restoration of $H_2S$ removal capacity.
3. Approximately 200 volumes of total gas/volume of $TeO_2$ could be passed over the tellurium dioxide before breakthrough occurred.
4. Note that until breakthrough occurs, $H_2S$ removal is almost quantitative.

EXAMPLE 3

Five cc (10.63 g.) of 10/20 mesh $TeO_2$ were charged to an electrically heated, ca. ¼ inch I.D. glass reactor. The gas were passed downflow over ca. 10cc of alpha $Al_2O_3$ 10–20 mesh to act as preheater, over the $TeO_2$ and finally over approximately 10 cc of ceramic beads. The exit gas passed through a 10% cadmium acetate solution and on to a wet test meter. The composition of the feed gas (approx. vol. %) was $H_2S$ 0.99%, $CH_4$ 3.03%., CO 21.80%., $CO_2$ 7.31%., $H_2$ 10.77%., and nitrogen 56.10%. The reactor was lined out at 100° C. with nitrogen prior to cutting in the blend gas. No breakthrough of $H_2S$ was noted after 7 hours of operation. The unit was shut down under nitrogen and the run resumed next day. After a total of approximately 13 hours, a faint yellow color was noted in the cadmium acetate solution. Approximately 96 total liters of gas (STP) were passed over the $TeO_2$ during the operation at approximately 1600 V/Hr./V prior to breakthrough. Data would indicate that excellent removal of $H_2S$ can be obtained with a representative feed gas. The $TeO_2$ changed in color from a light tan to black.

EXAMPLE 4

The reactor was discharged and filled with 10/20 mesh alpha $Al_2O_3$. After heating up to 100° C. with nitrogen, the $H_2S$ blend was cut in. Breakthrough, as evidenced by a yellow color in the cadmium acetate solution, occurred almost immediately (30 sec). Data show that the alpha $Al_2O_3$ used as a preheater is not removing any significant amounts of $H_2S$.

EXAMPLE 5

Five cc. (10.22 grams) of 10–20 mesh $TeO_2$ were charged to the reactor as in Example 3. The blend gas containing $H_2S$ were passed over the $TeO_2$ at room temperature (25° C.) Breakthrough occurred in about 1.5 hrs. at a V/Hr./V of ca. 930. The blend gas was cut out and nitrogen cut in and the temperature raised to 100° C. Sulfur was noted on the ceramic beads below the $TeO_2$.

Data would indicate that although complete $H_2S$ removal was obtained for a short while at room temperature, the $TeO_2$ deactivates rapidly (probably because of sulfur deposition). Use of small particle size $TeO_2$ in a fluidized bed would probably markedly improve capacity.

EXAMPLE 6

The $TeO_2$ from Example 5 (black in color) was regenerated in situ by heating to 350° C. while passing air over it. After heating overnight the $TeO_2$ was again a light tan in color. After lining out at 100° C. with $N_2$, the blend gas was cut in. After running for ca. 11.5 hours (1780 V/Hr./V) a total volume (STP) of gas equal to ca. 93 liters had been passed over the catalyst before breakthrough occurred. The cadmium acetate scrubber solutions were combined and analyzed for sulfur. Found 0.0016 g. of S. This corresponds to roughly 99.9% removal of sulfur passed over the $TeO_2$. The data indicate the feasibility of regeneration by air oxidation at 350° C.

EXAMPLE 7

The tellurium in the reactor from Example 6 was regenerated in situ by passage of air (80 cc/min) over it at 350° C. overnight. The feed gas blend containing $H_2S$ plus approximately 14 vol. % air was then passed over the $TeO_2$ after lining out at 110° C. After approximately 18.5 hours at ca. 2400 V/Hr./V, breakthrough was noted. The exit gas prior to going to the scrubber was analyzed (Dohrmann) for total sulfur and found to contain ca. 1300 ppm of which about half was $SO_2$. Analysis of the cadmium acetate scrubbers (combined) showed a total sulfur content of 0.1644 g. which corresponds to approximately 94% S removal. MS (mass spectrometric) analysis of the exit gas after the scrubber revealed that at these conditions no oxidation of the hydrogen or CO in the blend gas by the added air was occurring. Data indicate that capacity of the $TeO_2$ is more than doubled by air injection but that a small amount of the $H_2S$ (or sulfur) is being oxidized. It should be pointed out that until breakthrough occurred, the $H_2S$ was being removed quantitatively.

Data from Examples 3–7 are summarized in Table II.

TABLE II

| | | | | | |
|---|---|---|---|---|---|
| | $H_2S$ REMOVAL OVER $TeO_2$ | | | | |
| Run No. | 101 | 103 | 104 | 105[2] | 106[3,4] |
| Solid Reactant | $TeO_2$ | $\alpha Al_2O_3$ | $TeO_2$ | $TeO_2$ | $TeO_2$ |
| Feed Gas Composition (Vol. %) | | | | | |
| $H_2S$ | | | .99 | | .85 |
| $CH_4$ | | | 3.03 | | 2.61 |
| CO | | | 21.80 | | 18.75 |
| $CO_2$ | | | 7.31 | | 6.29 |
| $H_2$ | | | 10.77 | | 9.26 |
| Nitrogen | | | 56.10 | | 59.30 |
| Oxygen | | | | | 2.94 |
| V/Hr./V (Approx.) | 1620 | Immediate | 930 | 1780 | 2390 |
| Time to Break Through, Hrs.[1] | 13 | B.T. (30 sec) | 1.4 | 11.5 | 18.5 |
| Total Volume Gas, Li (STP) | 96 | — | 6.5 | 93 | 221 |
| Temp., ° C. | 100 | 100 | 25 | 100–110 | 110 |
| Grams S Passed Over Solid Reactant | — | — | — | 1.3240 | 2.6816 |
| Grams S Scrubber | — | — | — | .0016 | .1644 |
| % S Removed | — | — | — | 99.88 | 93.9% |

[1] Exit gas passed through cadmium acetate scrubber and WTM.
[2] Solid reactant from run 104 air regenerated overnight at 350° C.
[3] Solid reactant from run 105 air regenerated overnight at 350° C.
[4] Gas composition calculated on basis of mass spectrometric analysis (14% air).

EXAMPLE 8

The following example described the preparation of tellurium dioxide supported on alumina.

54.9 Grams of gamma alumina ($Al_2O_3$) extrudate having a surface area of 172 m²/g and a pore volume of 0.51 cc/g were placed in a porcelain dish. In a separate beaker, 10 grams of telluric acid ($H_2TeO_4.2H_2O$, 99.5% pure) were dissolved in 125 cm³ of $H_2O$. This solution was added to the alumina extrudate and stirred periodically. The resulting solids were then heated in a 20 to 26 inch Hg vacuum oven at 150° C. for 3 days. The oven heated resulting solid was a supported tellurium dioxide, i.e., $TeO_2$ on $Al_2O_3$.

EXAMPLE 9

Tests were made using the supported $TeO_2$ (about 9% $TeO_2$ on $Al_2O_3$) described in Example 8 as well as with an alumina control. The results of these tests are summarized in Table III.

TABLE III

| Run No. | 108 | 109 |
|---|---|---|
| Solid Reactant | 9.19% $TeO_2$ on $Al_2O_3$ | $Al_2O_3$ only (Control) |
| Feed Gas Composition (Vol. %) | | |
| $H_2S$ | .99% | |
| $CH_4$ | 3.03 | |
| CO | 21.80 | |
| $CO_2$ | 7.31 | |
| $H_2$ | 10.77 | |
| $N_2$ | 56.10 | |
| S.V. (V/Hr./V) | 800 | 800 |
| Temp., ° C. | 110 | 110 |
| Time to $H_2S$ Breakthrough | 109 Min. | 4 Min. |
| % $TeO_2$ Utilized | 81.3 | — |

The data indicate the feasibility of using $TeO_2$ on a support and show good utilization of the $TeO_2$ (ca. 81%). Note that for the time period of ca. 110 min. complete removal of $H_2S$ was achieved. There was some slight indication of sulfite formation (oxidation of sulfur) during the run.

What is claimed is:

1. A process for removing at least a portion of hydrogen sulfide from a gaseous mixture containing the same, which comprises contacting said gaseous mixture with a particulate tellurium dioxide reactant at reaction conditions and recovering a gaseous mixture having a reduced content of hydrogen sulfide.

2. The process of claim 1 wherein said tellurium dioxide is composited with a carrier.

3. The process of claim 2 wherein said carrier is selected from the group consisting of alumina, amorphous and crystalline silica-alumina, titania, zirconia, magnesia, thoria, boria, and mixtures thereof.

4. The process of claim 2 wherein said carrier is alumina.

5. The process of claim 1 wherein said reaction conditions include a temperature ranging from about 25° to about 250° C.

6. The process of claim 1 wherein the space velocity of said gaseous mixture ranges from about 400 to about 4000 V/Hr./V.

7. The process of claim 1 wherein after said reaction, the resulting deactivated reactant particles having a sulfur deposit thereon are subjected to a sulfur removal step.

8. The process of claim 7 wherein, after said sulfur removal step, the deactivated reactant comprising elemental tellurium is contacted with an oxidizing gas to form tellurium dioxide.

9. The process of claim 7 wherein said sulfur removal step comprises contacting said deactivated reactant particles with a stripping gas to remove the sulfur deposit from said particles.

10. The process of claim 7 wherein said sulfur removal step comprises contacting said deactivated reactant particles with a solvent to remove the sulfur deposit from said particles.

11. A process for removing at least a portion of hydrogen sulfide from a gaseous mixture containing the same, which comprises the steps of:
   a. contacting said gaseous mixture with a particulate tellurium dioxide reactant composited with a carrier at a temperature ranging from about 75° to about 125° C., at a gas space velocity ranging from about 800 to about 1200 V/Hr./V, at atmospheric pressure;
   b. recovering a gaseous mixture containing a reduced content of hydrogen sulfide;
   c. subjecting the deactivated reactant comprising elemental tellurium and a sulfur deposit to a sulfur removal treatment; and
   d. contacting the sulfur-removed reactant resulting from step (c) with an oxidizing gas in a regeneration zone at a temperature ranging from about 300° to about 400° C. to form tellurium dioxide.

12. The process of claim 11 wherein said sulfur removal treatment of step (c) comprises introducing a solvent into said regeneration zone.

13. The process of claim 11 wherein said sulfur removal treatment of step (c) comprises introducing a stripping gas into said regeneration zone.

* * * * *